Patented Apr. 14, 1953

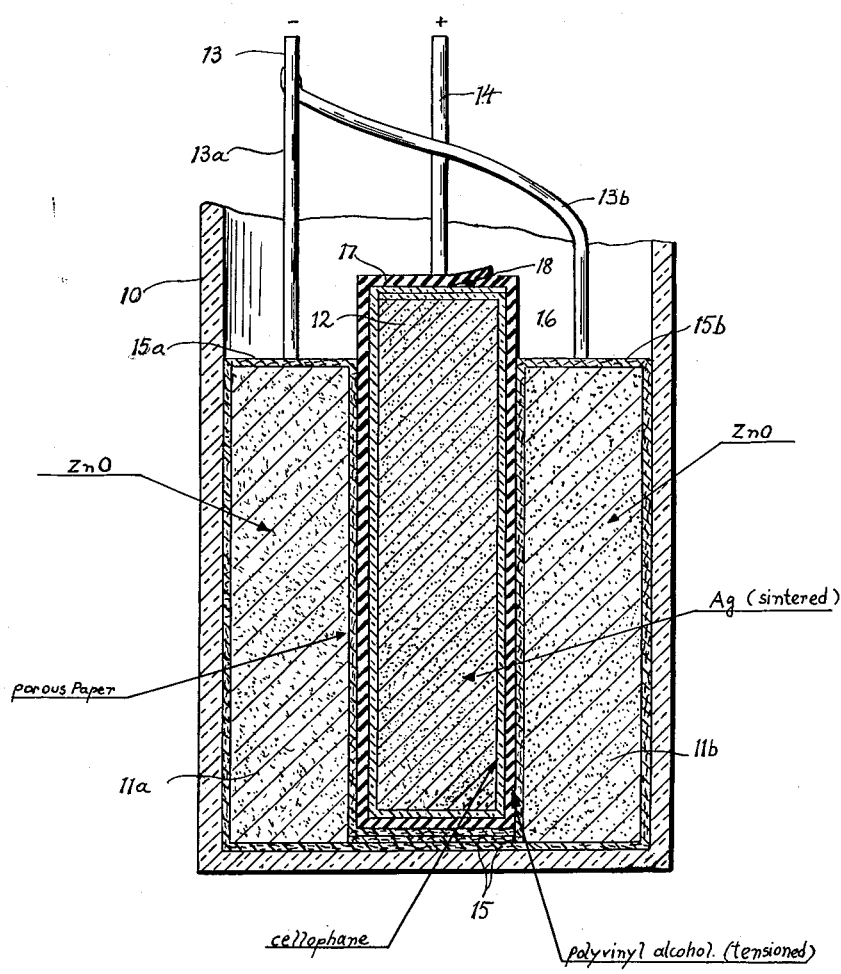

2,635,127

UNITED STATES PATENT OFFICE 2,635,127

INTERELECTRODE SEPARATOR FOR RECHARGEABLE BATTERIES

Michel N. Yardney, New York, and Martin E. Kagan, Bronx, N. Y., assignors to Yardney International Corp., New York, N. Y., a corporation of New York Application May 5, 1951, Serial No. 224,708

11 Claims. (Cl. 136—6)

The present invention relates to electric batteries, more particularly to batteries of the rechargeable silver-and-zinc type.

In various co-pending applications assigned to the assignee of the present application, such as Ser. No. 738,702, filed April 1, 1947, 66,291 and 66,292, filed December 20, 1948, 197,730, filed November 27, 1950, all issued April 29, 1952 as Patents Nos. 2,594,709, 2,594,710, 2,594,711 and 2,594,713, respectively, and Ser. No. 131,320, filed December 6, 1949, now Patent No. 2,601,133, issued June 17, 1952, there have been disclosed rechargeable batteries wherein one or more positive electrodes, consisting essentially of silver, and one or more negative electrodes, consisting essentially of zinc and/or zinc compounds, are immersed in an alkaline electrolyte and are spaced from one another by semi-permeable separators or membranes, the entire assembly being held in compression in a suitable casing.

The separators employed in the batteries heretofore described consisted either of regenerated cellulose (cellophane) or a combination of one or more cellophane layers with an additional layer or layers of a more permeable material, such as porous, absorbent paper; in the latter case it had been found advantageous to insert the more permeable layer or layers between the cellophane and the active electrode material in order to protect the cellophane from direct contact with the electrode material which could give rise to undesirable chemical reactions. It is a property of these separators to swell in the alkaline electrolyte and, by virtue of having been introduced with a relatively tight fit into the battery casing along with electrodes of substantially non-compressible, compact material, to exert pressure upon the electrodes and to be themselves compressed to prevent undue dilation of their interstices.

In the development of batteries adapted to be recharged a large number of times the need has arisen for providing a non-conductive separator whose semi-permeable characteristics (including the ability to swell and to exert pressure) should be similar to those of cellophane yet which should exhibit even greater ability to withstand repeated chargings and dischargings without appreciable deterioration, thus without giving rise to internal short circuits after a limited number of cycles.

The general object of the present invention is, accordingly, to provide a separator satisfying the stated requirements.

It is also an object of this invention to provide a method of lastingly protecting adjacent electrodes from contact with one another while enabling the passage of ions between them.

In accordance with the present invention there is provided, as a separator between electrodes of a battery as set forth above, at least one layer of polyvinyl alcohol, either alone or in combination with a layer or layers of cellophane and/or of a more porous material such as natural cellulosic paper (i. e. paper left in its naturally absorbent state, such as filter paper, "Aldex" paper, blotting paper). The polyvinyl alcohol may be a simple polymer with unlinked chains, or its chains may be cross-linked with the aid of suitable agents such as bifunctional aldehydes, alcohols or acids. In the latter case greater mechanical and chemical stability is obtained, at the expense of a slight decrease in the permeability of the membrane which may be compensated, in terms of internal cell resistance, by reducing the number and/or the thickness of the layers used. Furthermore, a more crystalline and, hence, mechanically and chemically more resistant molecule structure may also be obtained by placing the membrane under tensile stress, as by wrapping it in stretched condition around an electrode.

Among the agents adapted to form the cross-linkages between the polyvinyl alcohol chains of the membrane there may be mentioned oxalic acid, malonic acid, itaconic acid, formaldehyde, and glyoxal.

The accompanying drawing shows, schematically and by way of example, a battery constructed in accordance with the present invention.

The battery shown in the drawing comprises a housing 10 wherein there are assembled two negative electrodes 11a, 11b and a positive electrode 12 sandwiched between the former. The active material of the negative electrodes is comminuted zinc which in the discharged condition of the battery is oxidized to ZnO (and possibly also hydrolized, at least in part, to $Zn(OH)_2$); the active material of the positive electrode is comminuted silver which may be sintered as described in co-pending application Ser. No. 174,076, filed July 15, 1950. Negative leads 13a, 13b, merging at 13, and a positive lead 14 project from the negative electrodes 11a, 11b and from the positive electrode 12, respectively.

The electrodes 11a and 11b are individually wrapped in sections 15a, 15b of a generally U-shaped envelope 15 of porous paper, as described in co-pending application Ser. No. 153,830; an envelope 16 of cellophane surrounds the positive electrode 12. Between the positive electrode assembly 12, 16, on the one hand, and the negative assembly 11a, 11b, 15a, 15b, on the other hand, there is interposed a semi-permeable separator in the form of a membrane 17, this membrane consisting of polyvinyl alcohol which may or may not be cross-linked as described above. An electrolyte (not shown) of potassium hydroxide, saturated with zinc, permeates the entire assembly which is held under pressure in the casing 10.

The membrane 17 is preferably stretched when winding it about the electrode 12, the resulting tension being maintained, for example, by heat-sealing the overlapping edges of the membrane as indicated at 18.

Although the polyvinyl alcohol separator 17 has been shown in the drawing as an envelope completely surrounding the electrode 12, it should be understood that the same may also be used, instead, as a simple sheet placed between two electrodes, as a wrapper around a negative electrode, and so forth, and that in general this separator may be given any of the configurations disclosed for the cellophane separators in the various co-pending applications mentioned above. Also, the layers of porous paper and of cellophane shown in the drawing may be omitted or interchanged, or additional such layers may be included. Furthermore, it should be noted that at least part of the zinc of the negative electrode may be replaced by a different electronegative material, e. g. cadmium, and that at least part of the silver of the positive electrode may be similarly replaced by a different electropositive material, e. g. nickel.

What is claimed is:

1. A battery comprising a casing, an alkaline electrolyte in said casing, a positive and a negative electrode of substantially non-compressible, compact material in said electrolyte, and a membrane of polyvinyl alcohol interposed between said electrodes and permeated by said electrolyte, said electrodes and said membrane forming part of an assembly fitting tightly inside said casing, said permeated membrane exerting pressure upon said electrodes in said casing.

2. A battery according to claim 1 wherein each of said electrodes comprises a comminuted active material.

3. A battery according to claim 2 wherein the active material of said positive electrode contains silver and the active material of said negative electrode contains zinc.

4. A battery according to claim 1 wherein the active material of said negative electrode contains zinc and said electrolyte is saturated with zinc.

5. A battery according to claim 1, including means maintaining said membrane under tension.

6. The combination according to claim 1 wherein the polyvinyl alcohol is modified by means of an agent forming cross-links between the chains of said alcohol.

7. The combination according to claim 6 wherein said agent is selected from the group which consists of bifunctional alcohols, aldehydes and acids.

8. A battery according to claim 1 wherein said negative electrode contains an active material selected from the group which consists of zinc and cadmium.

9. A battery according to claim 1 wherein said positive electrode contains an active material selected from the group which consists of silver and nickel.

10. A battery comprising a casing, an alkaline electrolyte in said casing, a positive and a negative electrode of substantially non-compressible, compact material in said electrolyte, a membrane of polyvinyl alcohol interposed between said electrodes and permeated by said electrolyte, and at least one layer of a porous, non-conductive material inserted between said membrane and at least one of said electrodes, said electrodes, said membrane and said layer forming part of an assembly fitting tightly inside said casing, said permeated membrane exerting pressure upon said electrodes in said casing.

11. A battery comprising a casing, an alkaline electrolyte in said casing, a positive and a negative electrode of substantially non-compressible, compact material in said electrolyte, a membrane of polyvinyl alcohol interposed between said electrodes and permeated by said electrolyte, and at least one layer of cellophane inserted between said membrane and at least one of said electrodes, said electrodes, said membrane and said layer forming part of an assembly fitting tightly inside said casing, said permeated membrane exerting pressure upon said electrodes in said casing.

MICHEL N. YARDNEY.
MARTIN E. KAGAN.

References Cited in the file of this patent

UNITED STATES PATENTS

| Number | Name | Date |
|---|---|---|
| Re. 22,065 | Young | Apr. 7, 1942 |
| 2,176,427 | Kershaw | Oct. 17, 1939 |
| 2,256,105 | McConnell | Sept. 16, 1941 |
| 2,420,456 | White | May 13, 1947 |
| 2,422,045 | Ruben | June 10, 1947 |
| 2,448,052 | Roberts | Aug. 31, 1948 |
| 2,519,399 | Roberts | Aug. 22, 1950 |
| 2,566,114 | Bloch | Aug. 28, 1951 |
| 2,594,709 | Andre | Apr. 29, 1952 |
| 2,594,710 | Andre | Apr. 29, 1952 |
| 2,594,711 | Andre | Apr. 29, 1952 |
| 2,594,712 | Andre | Apr. 29, 1952 |
| 2,594,713 | Andre | Apr. 29, 1952 |

OTHER REFERENCES

Vinyl Products Bulletin, V. 7–1148 on "ELVANOL" by DuPont.

Nye (Abstract), S. N. 627,080, January 17, 1950.